US012570070B2

(12) United States Patent
    Kani et al.

(10) Patent No.: US 12,570,070 B2
(45) Date of Patent: Mar. 10, 2026

(54) LAYERED BODY AND LAYERING METHOD

(71) Applicant: MITSUBISHI HEAVY INDUSTRIES, LTD., Tokyo (JP)

(72) Inventors: Yuki Kani, Tokyo (JP); Ryota Ozaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 513 days.

(21) Appl. No.: 17/795,739

(22) PCT Filed: Feb. 28, 2020

(86) PCT No.: PCT/JP2020/008205
    § 371 (c)(1),
    (2) Date: Jul. 27, 2022

(87) PCT Pub. No.: WO2021/171529
    PCT Pub. Date: Sep. 2, 2021

(65) Prior Publication Data
    US 2023/0064511 A1      Mar. 2, 2023

(51) Int. Cl.
    *B32B 5/12*          (2006.01)
    *B29C 70/20*         (2006.01)
    (Continued)

(52) U.S. Cl.
    CPC .............. *B32B 5/12* (2013.01); *B29C 70/205* (2013.01); *B29C 70/304* (2021.05); *B32B 3/18* (2013.01);
    (Continued)

(58) Field of Classification Search
    CPC ....... B32B 2260/023; B32B 5/12; B32B 7/03; B32B 37/182; B29C 70/304
    See application file for complete search history.

(56) References Cited

U.S. PATENT DOCUMENTS

| | | | |
|---|---|---|---|
| 5,394,906 A | 3/1995 | Farley | |
| 9,102,103 B2 | 8/2015 | Fox et al. | |

(Continued)

FOREIGN PATENT DOCUMENTS

| | | |
|---|---|---|
| JP | 2008-540168 A | 11/2008 |
| JP | 2010-150685 A | 7/2010 |

(Continued)

OTHER PUBLICATIONS

PCT/ISA/210, "International Search Report for PCT International Application No. PCT/JP2020/008205," May 26, 2020.

(Continued)

*Primary Examiner* — Jennifer A Boyd
(74) *Attorney, Agent, or Firm* — HAUPTMAN HAM, LLP

(57) ABSTRACT

A layered body includes a first layer with a plurality of first composite sheets, and a second layer with a plurality of second composite sheets in a state of contacting the first layer. The first composite sheets are disposed along an arrangement direction shaped as a curved line so that an end in a first longitudinal direction of one first composite sheet and an end in the first longitudinal direction of an adjacent first composite sheet are close to each other without overlapping in the thickness direction, and so that the first longitudinal directions of the sheets intersect each other. The second composite sheets are disposed along the arrangement direction so that an end in a second longitudinal direction of one second composite sheet and an end in the second longitudinal direction of an adjacent second composite sheet are close to each other without overlapping in the thickness direction.

10 Claims, 10 Drawing Sheets

(51) Int. Cl.

| | | |
|---|---|---|
| *B29C 70/30* | (2006.01) | |
| *B32B 3/18* | (2006.01) | |
| *B32B 5/26* | (2006.01) | |
| *B32B 7/03* | (2019.01) | |
| *B32B 37/02* | (2006.01) | |
| *B32B 37/18* | (2006.01) | |

(52) U.S. Cl.

CPC ................. *B32B 5/26* (2013.01); *B32B 7/03* (2019.01); *B32B 37/02* (2013.01); *B32B 37/182* (2013.01); *B32B 2250/20* (2013.01); *B32B 2250/24* (2013.01); *B32B 2260/023* (2013.01); *B32B 2260/046* (2013.01); *B32B 2305/10* (2013.01); *B32B 2605/18* (2013.01)

(56) References Cited

U.S. PATENT DOCUMENTS

| | | | |
|---|---|---|---|
| 2006/0249868 A1 | 11/2006 | Brown et al. | |
| 2007/0029038 A1 | 2/2007 | Brown et al. | |
| 2009/0102092 A1* | 4/2009 | Westerdahl | B29C 66/49 |
| | | | 264/258 |
| 2009/0317585 A1 | 12/2009 | Bech | |
| 2010/0285265 A1 | 11/2010 | Shinoda et al. | |
| 2011/0287213 A1 | 11/2011 | Suzuki et al. | |
| 2012/0076973 A1* | 3/2012 | Guzman | B29C 70/207 |
| | | | 156/499 |
| 2014/0186575 A1* | 7/2014 | Suzuki | D04H 3/04 |
| | | | 428/113 |

FOREIGN PATENT DOCUMENTS

| | | | |
|---|---|---|---|
| JP | 2011-255533 A | 12/2011 | |
| JP | 4987002 B2 | 7/2012 | |
| JP | 2014-504566 A | 2/2014 | |
| WO | WO2010/087443 A1 | 8/2010 | |

OTHER PUBLICATIONS

PCT/ISA/237, "Written Opinion for PCT International Application No. PCT/JP2020/008205," May 26, 2020.

Japan Patent Office, "Office Action for Japanese Patent Application 2022-502752," Apr. 4, 2023.

* cited by examiner

FD1d (FD1)

LD1d (LD1)

110d (110)

SD1d (SD1)

LD1c
(LD1)

$\alpha$

LD1d
(LD1)

$\theta$

FD1d (FD1)

LAYERED BODY AND LAYERING METHOD

RELATED APPLICATIONS

The present application is National Phase of International Application No. PCT/JP2020/008205 filed Feb. 28, 2020, the disclosure of which is hereby incorporated by reference herein in its entirety.

TECHNICAL FIELD

The present disclosure relates to a laminate in which a second layer that includes a plurality of second composite sheets is laminated in a state of being in contact with a first layer that includes a plurality of first composite sheets, and a lamination method.

BACKGROUND ART

In the related art, a laminate in which composite sheets each including a fiber base material such as glass fiber or carbon fiber and a resin material are laminated is known (refer to, for example, PTL 1). PTL 1 discloses a method of cutting a flat rectangular laminate into a desired shape and cutting it out in order to manufacture a component of a composite sheet extending in a curved shape in an in-plane direction.

CITATION LIST

Patent Literature

[PTL 1] U.S. Pat. No. 9,102,103

SUMMARY OF INVENTION

Technical Problem

However, in the method disclosed in PTL 1, since an unnecessary portion is generated when the composite sheet extending in a curved shape in the in-plane direction is cut out, the whole of the flat rectangular laminate cannot be effectively utilized, and thus the manufacturing cost increases.

Further, for example, in a case where a composite sheet that extends linearly is used in order to manufacture a component of a composite sheet extending in a curved shape in the in-plane direction, it is necessary to laminate the composite sheets while bending them in a curved shape. In this case, since the composite sheet has a property of being difficult to expand and contract, there is a possibility that wrinkles may be generated due to deformation occurring in the plane of the composite sheet when the composite sheets are laminated. Then, if the wrinkled composite sheets are laminated over a plurality of layers, the manufacturing defect of the laminate occurs.

The present disclosure has been made in view of such circumstances, and has an object to provide a laminate having a shape extending in a curved shape in an in-plane direction, a low manufacturing cost, and a high manufacturing quality, and a lamination method of the laminate.

Solution to Problem

A laminate according to an aspect of the present disclosure includes: a plurality of first composite sheets having a first longitudinal direction and a first lateral direction and including a first fiber base material oriented in a first fiber direction having a first predetermined angle with respect to the first longitudinal direction and a first resin material; and a plurality of second composite sheets having a second longitudinal direction and a second lateral direction and including a second fiber base material oriented in a second fiber direction having a second predetermined angle with respect to the second longitudinal direction and a second resin material, in which a second layer that includes the plurality of second composite sheets is laminated in a state of being in contact with a first layer that includes the plurality of first composite sheets, the plurality of first composite sheets are disposed along a curved arrangement direction such that an end portion in the first longitudinal direction of the first composite sheet on one side and an end portion in the first longitudinal direction of the first composite sheet on the other side, which is adjacent to the first composite sheet on the one side, are in contiguity with each other in a state where the end portions do not overlap each other in a thickness direction and the first longitudinal direction of the first composite sheet on the one side and the first longitudinal direction of the first composite sheet on the other side intersect with each other, and the plurality of second composite sheets are disposed along the arrangement direction such that an end portion in the second longitudinal direction of the second composite sheet on one side and an end portion in the second longitudinal direction of the second composite sheet on the other side, which is adjacent to the second composite sheet on the one side, are in contiguity with each other in a state where the end portions do not overlap each other in the thickness direction and the second longitudinal direction of the second composite sheet on the one side and the second longitudinal direction of the second composite sheet on the other side intersect with each other.

A lamination method according to another aspect of the present disclosure is a lamination method of laminating a second layer that includes a plurality of second composite sheets in a state of being in contact with a first layer that includes a plurality of first composite sheets, in which the first composite sheet has a first longitudinal direction and a first lateral direction and is formed in a form of a sheet that includes a first fiber base material oriented in a first fiber direction having a first predetermined angle with respect to the first longitudinal direction and a first resin material, and the second composite sheet has a second longitudinal direction and a second lateral direction and is formed in a form of a sheet that includes a second fiber base material oriented in a second fiber direction having a second predetermined angle with respect to the second longitudinal direction and a second resin material, the method including: a first laminating step of disposing the plurality of first composite sheets along an arrangement direction such that an end portion in the first longitudinal direction of the first composite sheet on one side and an end portion in the first longitudinal direction of the first composite sheet on the other side, which is adjacent to the first composite sheet on the one side, are in contiguity with each other in a state where the end portions do not overlap each other in a thickness direction and the first longitudinal direction of the first composite sheet on the one side and the first longitudinal direction of the first composite sheet on the other side intersect with each other; and a second laminating step of disposing the plurality of second composite sheets along the arrangement direction such that an end portion in the second longitudinal direction of the second composite sheet on one side and an end portion in the second longitudinal direction of the second composite sheet on the other side, which is adjacent to the second composite sheet on the one side, are in contiguity with each other in a state where the end portions do not overlap each other in the thickness direction and the second longitudinal direction of the second composite sheet on the one side and the second longitudinal direction of the second composite sheet on the other side intersect with each other.

Advantageous Effects of Invention

According to the present disclosure, it is possible to provide a laminate having a shape extending in a curved shape in an in-plane direction, a low manufacturing cost, and a high manufacturing quality, and a lamination method of the laminate.

DESCRIPTION OF EMBODIMENTS

First Embodiment

Figure 1:
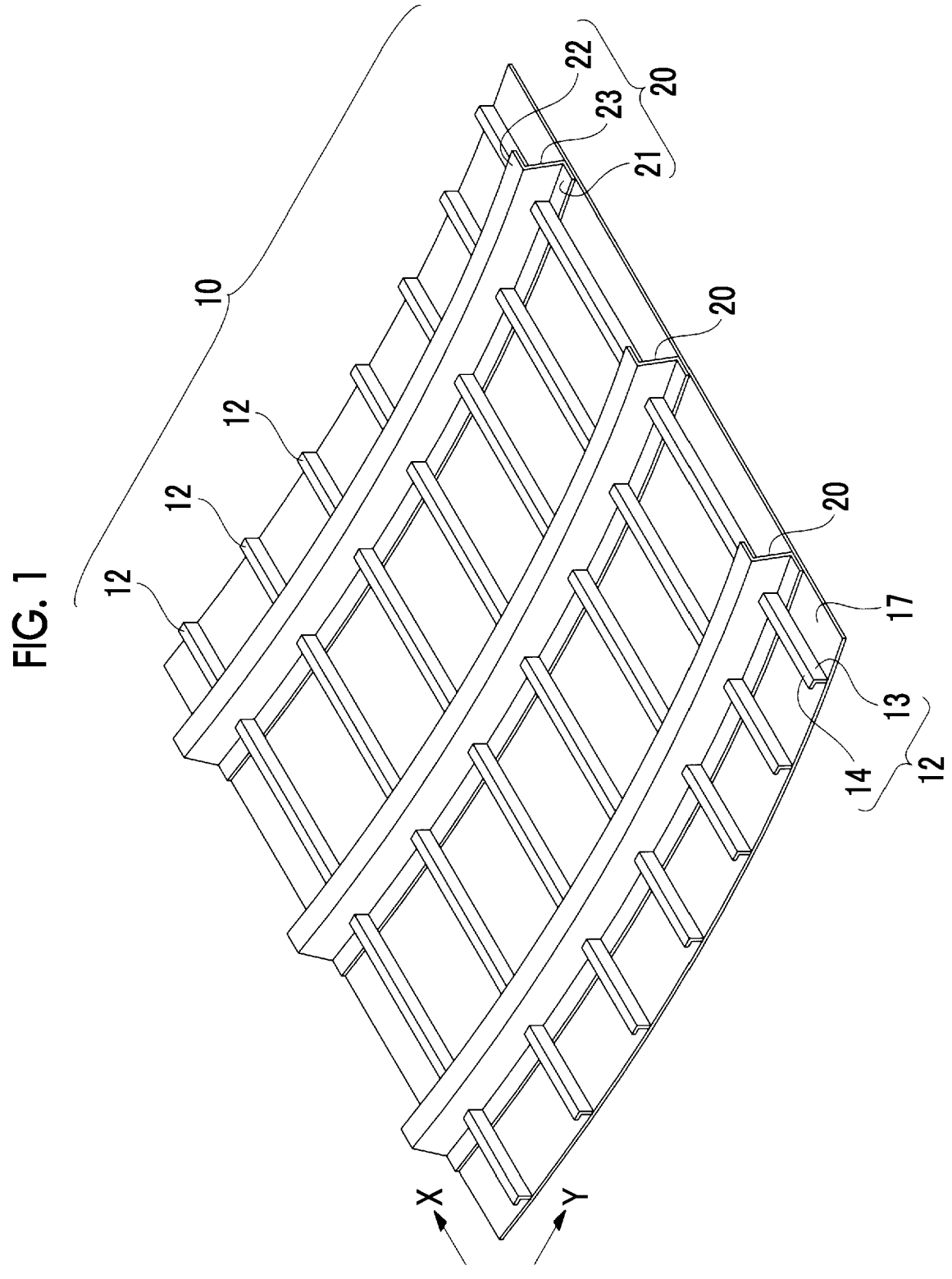
FIG. 1 is a perspective view showing a panel structure according to an embodiment of the present disclosure.

Hereinafter, a laminate 100 and a lamination method of the laminate 100 according to an embodiment of the present disclosure will be described with reference to the drawings. FIG. 1 is a perspective view showing a panel structure 10 according to an embodiment of the present disclosure. The panel structure 10 of the present embodiment includes a frame 20 that is manufactured from the laminate 100.

The panel structure 10 of the present embodiment is a structure configuring a cylindrical fuselage of an aircraft. As shown in FIG. 1, the panel structure has a face plate 17, a plurality of ribs 12 provided parallel to each other on one surface of the face plate 17, and a plurality of frames 20 provided parallel to each other in a direction intersecting the direction in which the rib 12 extends. The frame 20 of the present embodiment is manufactured by shaping a planar laminate, in which composite sheets each including a fiber base material and a resin material are laminated over a plurality of layers (for example, 20 or more layers), into a Z shape. Although the frame 20 shown in FIG. 1 has a Z shape, it may have another shape such as a C shape.

The direction in which the rib 12 extends is defined as a rib direction X, and the direction in which the frame 20 extends is defined as a frame direction (a material axis direction) Y. As shown in FIG. 1, the rib 12 has a rib main body 13 that rises vertically from one surface of the face plate 17, and a flange portion 14 that extends in a direction parallel to the face plate 17 from an end portion of the rib main body 13. That is, the rib 12 has an L shape in a cross section perpendicular to the rib direction X, in which one arm portion of the L shape forms the rib main body 13 and the other arm portion of the L shape forms the flange portion 14.

As shown in FIG. 1, the frame 20 has a frame main body 23 that rises from one surface of the face plate 17, a first flange portion 21 facing the face plate 17 and extending to one side in the rib direction X from an end portion on the face plate 17 side of the frame main body 23, and a second flange portion 22 facing the face plate 17 and extending to the other side in the rib direction X from an end portion on the side away from the face plate 17 side of the frame main body 23. That is, the frame 20 has a Z shape in a cross section perpendicular to the frame direction Y, in which one arm portion of the Z shape forms the first flange portion 21 and the other arm portion of the Z shape forms the second flange portion 22.

As shown in FIG. 1, the frame 20 has a shape extending in a curved shape in an in-plane direction of the frame main body 23 (a direction horizontal to the surface of the frame main body 23). That is, the frame 20 has an arcuate shape centered on the central axis of a substantially cylindrical aircraft fuselage (not shown) that is formed by combining the panel structures.

Next, the laminate 100 of the present embodiment will be described with reference to the drawings. The laminate 100 of the present embodiment is made by disposing a plurality of composite sheets along a curved arrangement direction AD to form a layer of the composite sheet, and laminating the layers of the composite sheets over a plurality of layers.

In this embodiment, as an example of the laminate 100, a laminate is shown in which one layer is formed by continuously disposing six composite sheets along the arrangement direction AD and the layers of the composite sheet are laminated by six layers. However, other aspects may be adopted. For example, one layer may be composed of an arbitrary number of composite sheets different from the six composite sheets, and the laminate may be composed of composite sheets of an arbitrary number of layers different from six layers.

The composite sheet to be laminated as the laminate 100 is a sheet-like material that includes a fiber base material (for example, carbon fiber or glass fiber) and a resin material. As the resin material, either thermosetting resin or thermoplastic resin can be used. The thermosetting resin is, for example, epoxy resin, unsaturated polyester, vinyl ester, phenol, cyanate ester, polyimide, or the like.

The thermoplastic resin is, for example, polyetherether-ketone (PEEK), polyethylene terephthalate (PET), polybuty-lene terephthalate (PBT), nylon 6 (PA6), nylon 66 (PA66), polyphenylene sulfide (PPS), polyetherimide (PEI), polyetherketoneketone (PEKK), or the like.

Figure 2:
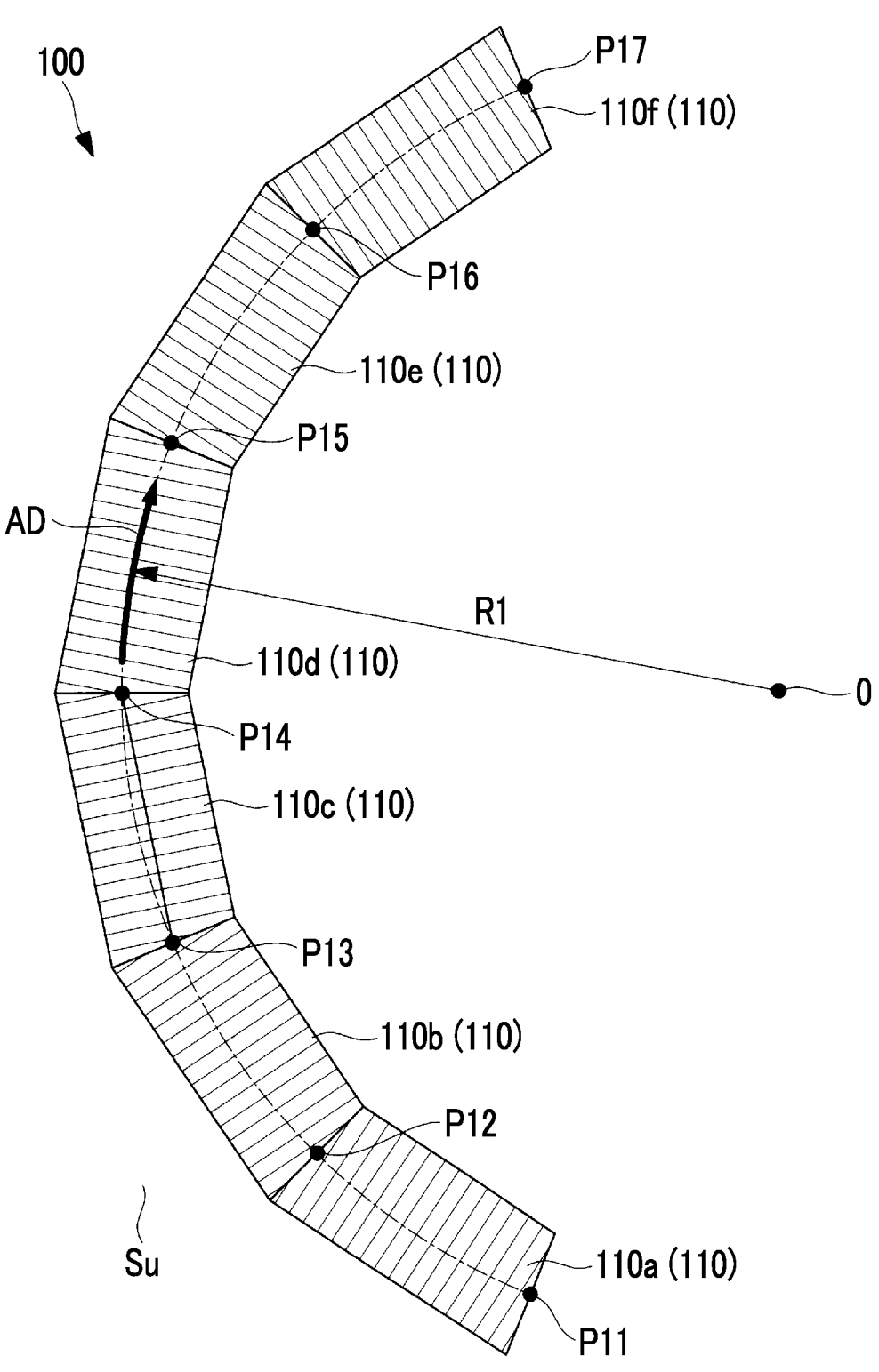
FIG. 2 is a plan view showing a laminate in which a plurality of first composite sheets are loaded on a lamination surface.
Figure 3:
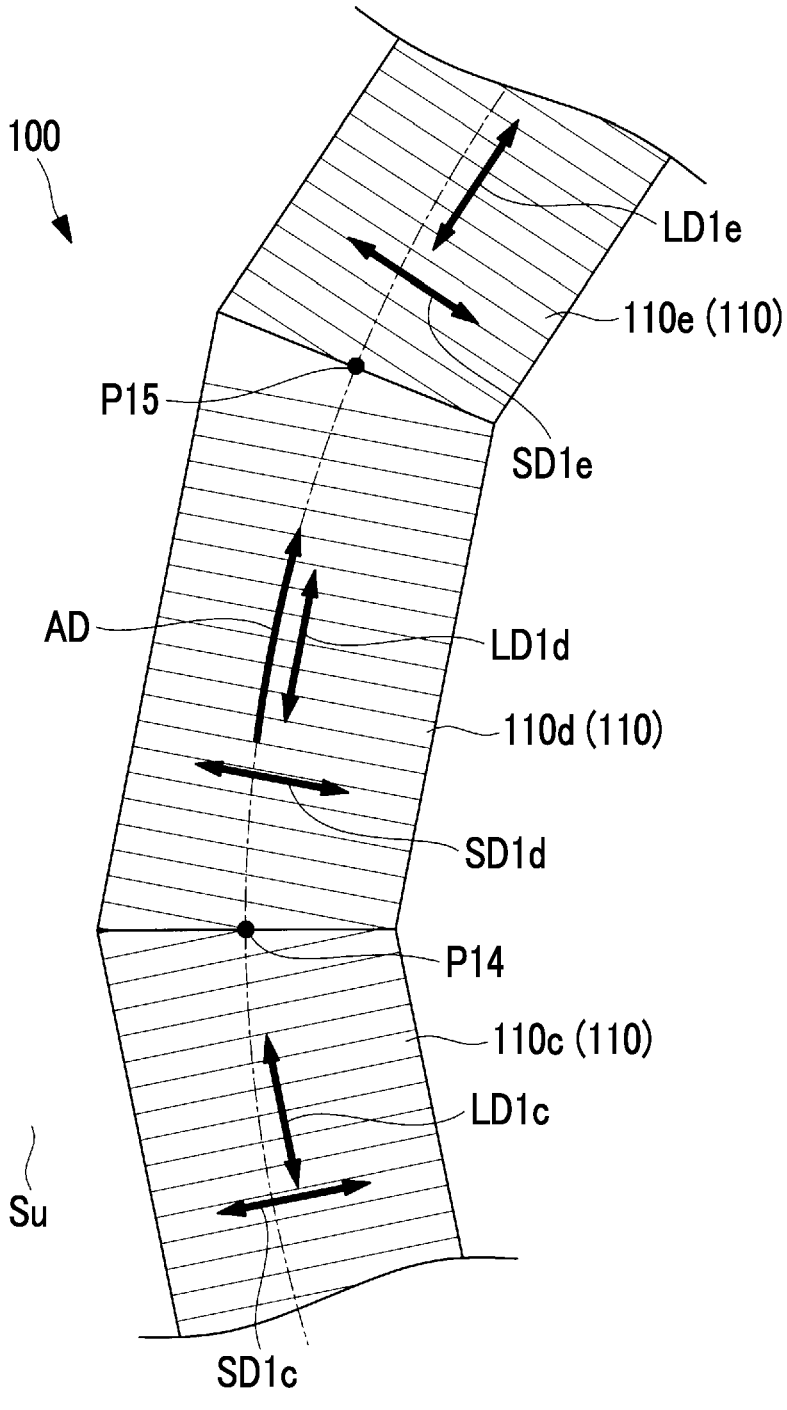
FIG. 3 is a partially enlarged view of the laminate shown in FIG. 2.
Figure 4:
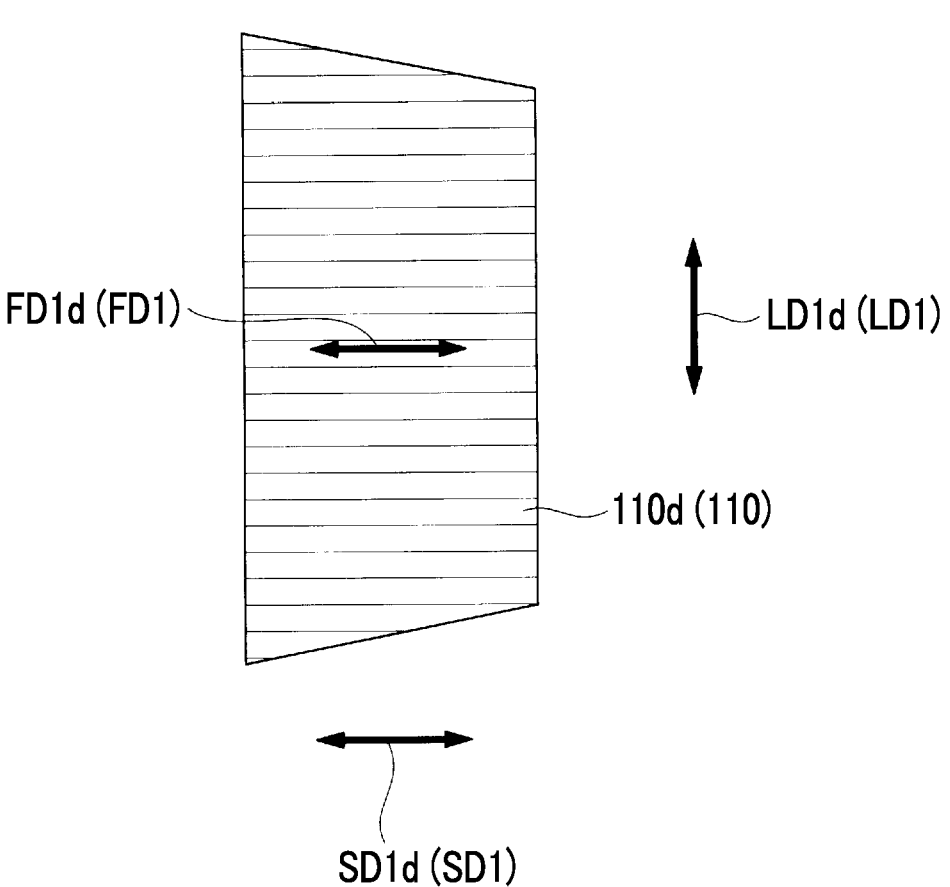
FIG. 4 is a plan view of the first composite sheet shown in FIG. 3.
Figure 5:
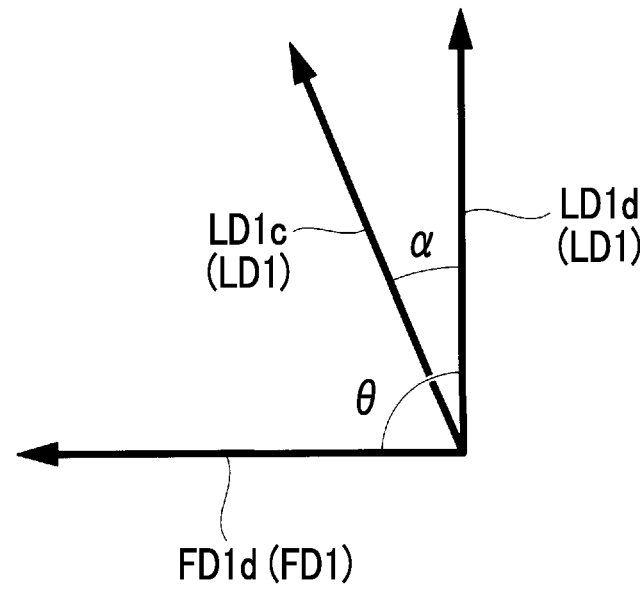
FIG. 5 is a diagram showing the relationship between a first longitudinal direction of the first composite sheet on one side and a first longitudinal direction of the first composite sheet on the other side, which is adjacent to the first composite sheet on the one side.

FIG. 2 is a plan view showing a laminate in which a plurality of first composite sheets 110 are loaded on a lamination surface Su. FIG. 3 is a partially enlarged view of the laminate 100 shown in FIG. 2. FIG. 4 is a plan view of the first composite sheet 110 shown in FIG. 3. FIG. 5 is a diagram showing the relationship between a first longitudi-nal direction LD1c of a first composite sheet 110c on one side and a first longitudinal direction LD1d of a first com-posite sheet 110d on the other side, which is adjacent to the first composite sheet 110c on the one side. In the laminate 100 of the present embodiment, finally, six layers are lami-nated, and therefore, the laminate 100 shown in FIGS. 2 and 3 is at a stage before lamination is completed.

Figure 12:
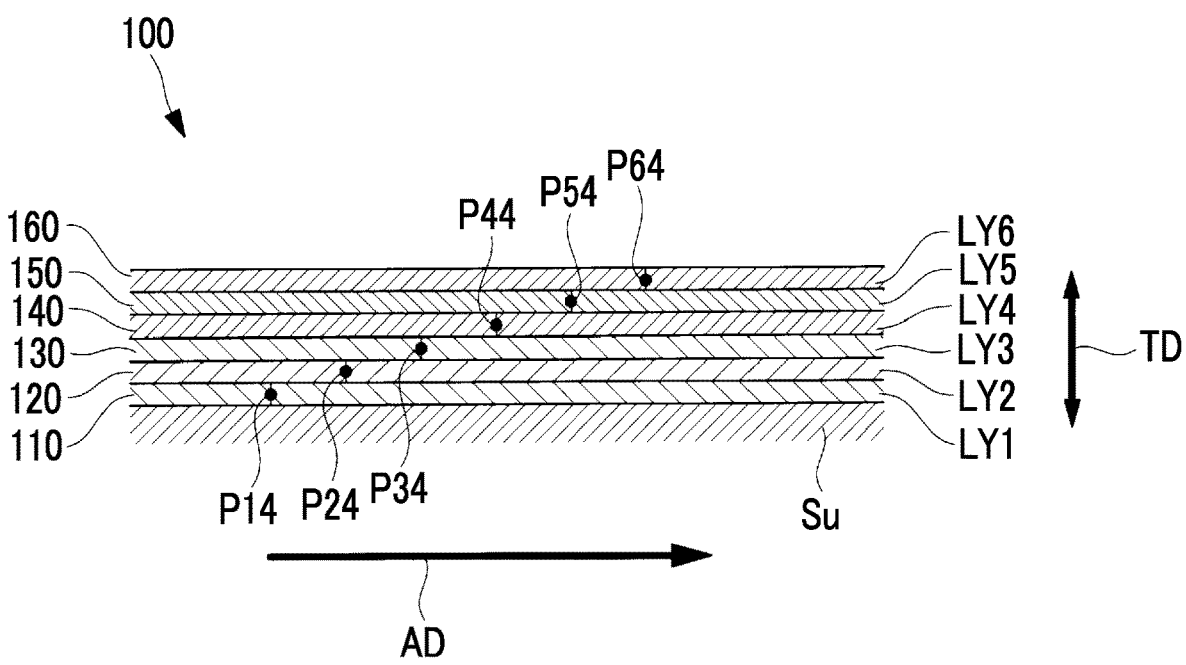
FIG. 12 is a sectional view taken along line A-A and viewed in the direction of an arrow in the laminate shown in FIG. 11.

As shown in FIG. 2, in the laminate 100 of the present embodiment, an end portion in the longitudinal direction (the first longitudinal direction) of the first composite sheet 110 on one side and an end portion in the longitudinal direction (the first longitudinal direction) of the first com-posite sheet 110 on the other side, which is adjacent to the first composite sheet 110 on the one side, are disposed in contiguity with each other in a state where the end portions do not overlap each other in a thickness direction (a thick-ness direction TD shown in FIG. 12). The first composite sheet 110 is a sheet-like material that includes the fiber base material (a first fiber base material) and the resin material (a first resin material).

The lamination surface Su shown in FIG. 2 is a surface on which the composite sheets are installed in order to laminate a plurality of layers of composite sheets that includes a plurality of first composite sheets 110. The thickness direc-tion is a direction orthogonal to the lamination surface Su, and is a direction in which the thickness of the laminate 100 is increased by laminating a plurality of layers of composite sheets.

In the example shown in FIG. 2, the plurality of first composite sheets 110 are disposed in the order of a first composite sheet 110a, a first composite sheet 110b, the first composite sheet 110c, the first composite sheet 110d, a first composite sheet 110e, and a first composite sheet 110f clockwise along the arrangement direction AD passing on an arc having a radius R1 centered on a point O.

In the present embodiment, the arrangement direction AD is a direction passing on an arc having the radius R1 centered on the point O. However, other aspects may be acceptable. The arrangement direction AD may be a direction along any other curved line, such as a direction extending along a curved line that is bent in a certain direction, for example.

As shown in FIG. 2, the plurality of first composite sheets 110 are disposed such that positions P11 to P17 are end portion positions (first end portion positions). The end portions in the longitudinal direction of the first composite sheet 110a are disposed at the positions P11 and P12, the end portions in the longitudinal direction of the first composite sheet 110b are disposed at the positions P12 and P13, and the end portions in the longitudinal direction of the first com-posite sheet 110c are disposed at the positions P13 and P14. The end portions in the longitudinal direction of the first composite sheet 110d are disposed at the positions P14 and P15, the end portions in the longitudinal direction of the first composite sheet 110e are disposed at the positions P15 and P16, and the end portions in the longitudinal direction of the first composite sheet 110f are disposed at the positions P16 and P17.

As shown in FIG. 3, the first composite sheet 110c has the first longitudinal direction LD1c along the arrangement direction AD and a first lateral direction SD1c orthogonal to the first longitudinal direction LD1c in the plane of the first composite sheet 110c. The first composite sheet 110d has the first longitudinal direction LD1d along the arrangement direction AD and a first lateral direction SD1d orthogonal to the first longitudinal direction LD1d. The first composite sheet 110e has a first longitudinal direction LD1e along the arrangement direction AD and a first lateral direction SD1e orthogonal to the first longitudinal direction LD1e. Each of the first composite sheet 110a, the first composite sheet 110b, the first composite sheet 110e, and the first composite sheet 110f also has the first longitudinal direction LD1 and the first lateral direction SD1 orthogonal to the first longi-tudinal direction LD1.

As shown in FIG. 4, the first composite sheet 110d has an isosceles trapezoidal shape in which the length of the first longitudinal direction LD1d on the other side (the outer periphery side with respect to the point O) in the first lateral direction SD1d is longer than the length of the first longi-tudinal direction LD1d on one side (the inner periphery side with respect to the point O) in the first lateral direction SD1d. The other first composite sheets 110 (110a, 110b, 110c, 110e, 110f) also has the same shape.

In the laminate 100 of the present embodiment, the side of the end portion in the first longitudinal direction LD1 of the first composite sheet 110 having an isosceles trapezoidal shape and the side of the end portion in the first longitudinal direction LD1 of the other first composite sheet 110 adjacent to the first composite sheet 110 are disposed without a gap along the arrangement direction AD such that the positions of the sides coincide with each other.

The line on the surface of the first composite sheet 110d shown in FIG. 4 indicates a fiber direction (a first fiber direction FD1) in which the fiber base material that is included in the first composite sheet 110d is oriented. As shown in FIG. 5, a first fiber direction FD1d of the first composite sheet 110d has a predetermined angle θ (a first predetermined angle) with respect to the first longitudinal direction LD1d. The first predetermined angle θ shown in FIG. 4 is 90 degrees.

As shown in FIG. 3, in the laminate 100 of the present embodiment, the first fiber directions FD1 with respect to the first longitudinal directions (LD1) of the plurality of first composite sheets 110 configuring a first layer have the same angle (90 degrees). In the laminate 100 of the present embodiment, also with respect to second to sixth layers, the fiber directions with respect to the longitudinal directions of the plurality of composite sheets configuring each layer have the same angle.

In the present embodiment, the first fiber direction FD1 of the first composite sheet 110 that is laminated in the first layer has an angle of 90 degrees with respect to the first longitudinal direction LD1. However, other aspects may be acceptable. For example, the angle (the first predetermined angle) formed by the first fiber direction FD1 and the first longitudinal direction LD1d of the first composite sheet 110 that is laminated in the first layer may be set to be any angle such as 0 degrees (the same direction), 45 degrees, or −45 degrees.

As shown in FIG. 2, each of the first composite sheets 110a, 110b, 110c, 110d, 110e, and 110f is disposed along the curved arrangement direction AD such that the first longitudinal direction LD1 of the first composite sheet 110 on one side and the first longitudinal direction LD1 of the first composite sheet 110 on the other side, which is adjacent to the first composite sheet 110 on the one side, intersect with each other. As shown in FIGS. 3 and 5, for example, the first longitudinal direction LD1*d* of the first composite sheet 110*d* on one side and the first longitudinal direction LD1*c* of the first composite sheet 110*c* on the other side, which is adjacent to the first composite sheet 110*d* on the one side, are disposed so as to intersect with each other at an intersection angle α.

Here, the intersection angle α is set to preferably 30 degrees or smaller and more preferably 22.5 degrees or smaller. In the laminate 100 of the present embodiment, a plurality of composite sheets are disposed along the arc-shaped arrangement direction AD. However, each composite sheet is not formed in an arc shape but is formed linearly in the longitudinal direction. Therefore, the longitudinal direction of the composite sheet and the arrangement direction AD do not completely coincide with each other and are approximated.

If the intersection angle α increases, the degree of approximation between the longitudinal direction of the composite sheet and the arrangement direction AD decreases, and therefore, in order to secure the degree of approximation between the longitudinal direction and the arrangement direction AD, it is preferable to set an upper limit for the intersection angle α. By setting the intersection angle α to 30 degrees or smaller, it is possible to suppress a change of the longitudinal direction in a pair of adjacent composite sheets to 30 degrees or smaller to secure the degree of approximation between the longitudinal direction and the arrangement direction AD.

Next, the laminate 100 in which a plurality of second composite sheets 120 are laminated in a state of being in contact with the plurality of first composite sheets 110 disposed on the lamination surface Su will be described with reference to the drawings.

Figure 6:
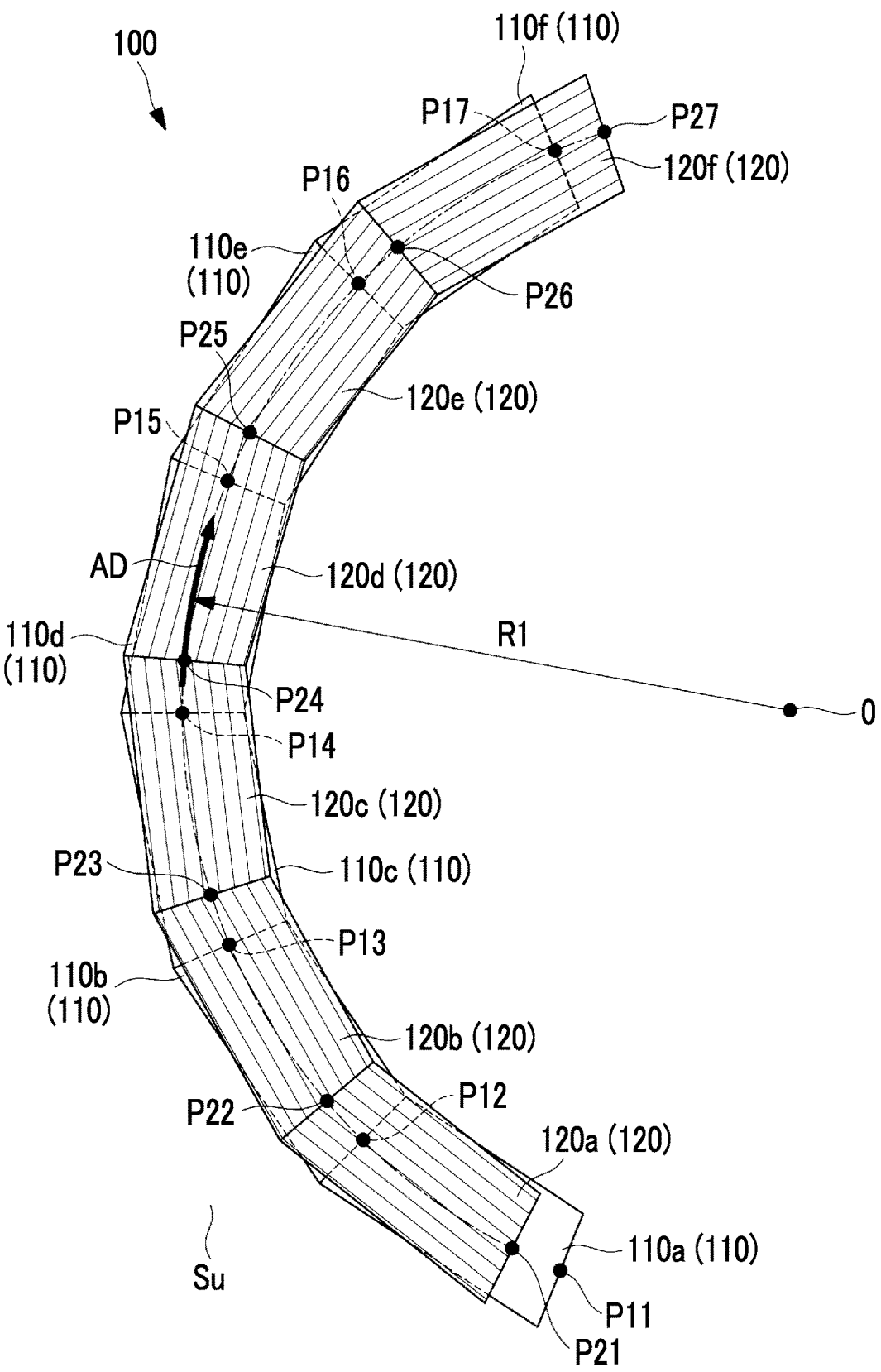
FIG. 6 is a plan view showing a laminate in which a plurality of second composite sheets are laminated on the first composite sheets.
Figure 7:
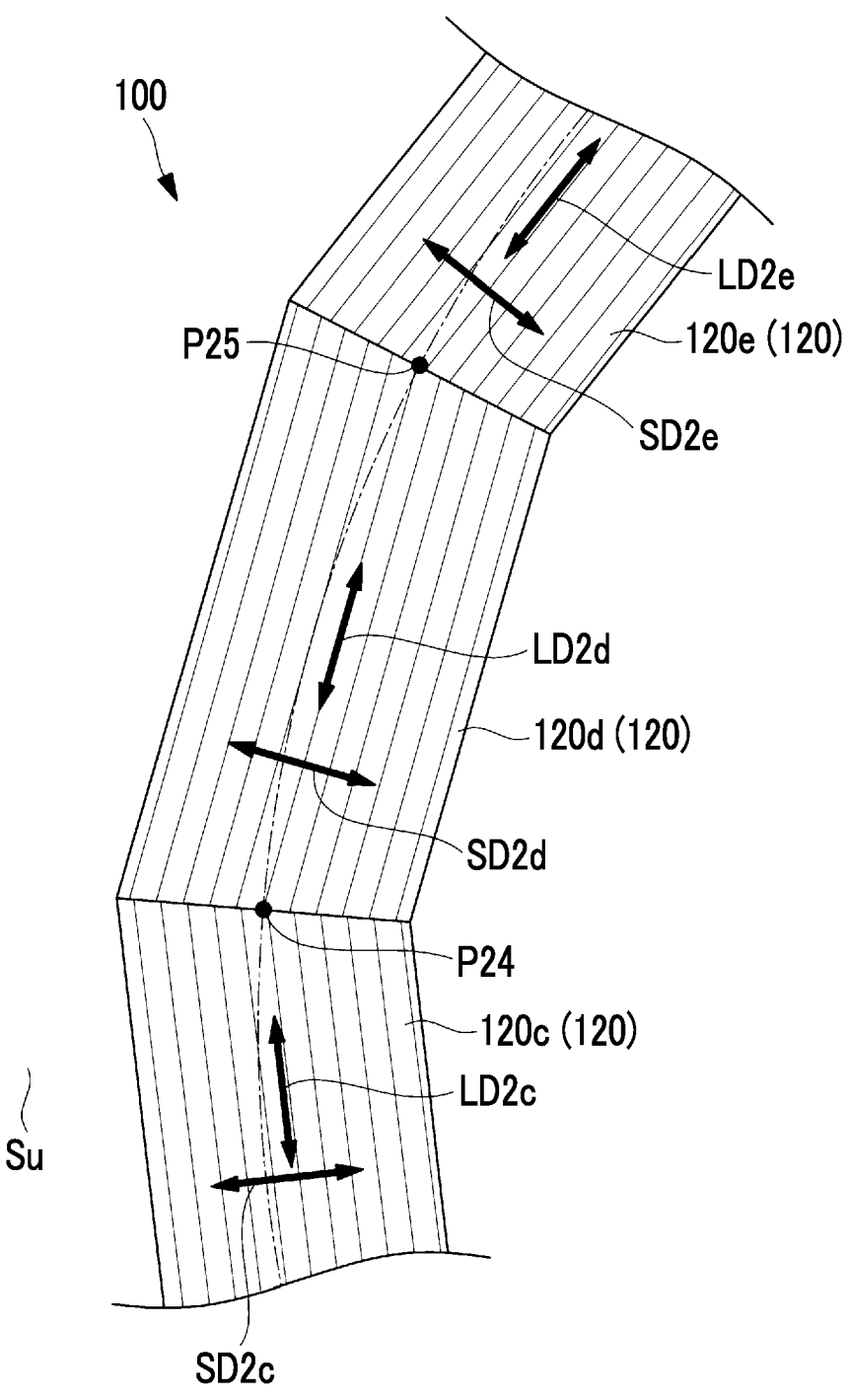
FIG. 7 is a partially enlarged view of the laminate shown in FIG. 6.
Figure 8:
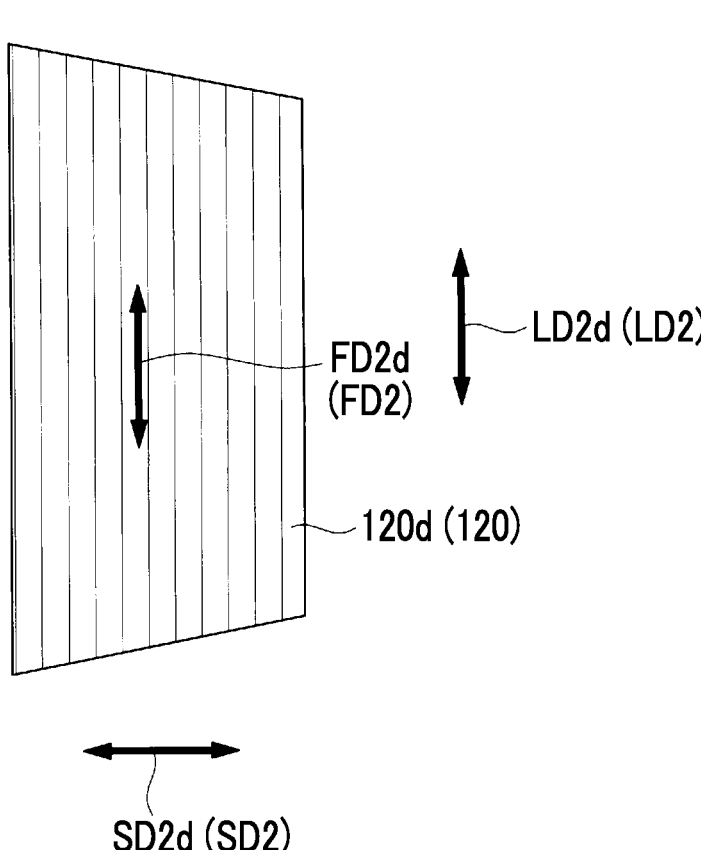
FIG. 8 is a plan view of the second composite sheet shown in FIG. 7.
Figure 9:
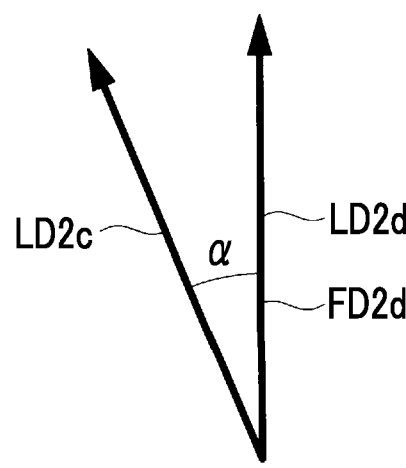
FIG. 9 is a diagram showing the relationship between a second longitudinal direction of the second composite sheet on one side and a second longitudinal direction of the second composite sheet on the other side, which is adjacent to the second composite sheet on the one side.

FIG. 6 is a plan view showing the laminate 100 in which the plurality of second composite sheets 120 are laminated on the plurality of first composite sheets 110. FIG. 7 is a partially enlarged view of the laminate 100 shown in FIG. 6. FIG. 8 is a plan view of the second composite sheet 120 shown in FIG. 7. FIG. 9 is a diagram showing the relationship between a second longitudinal direction LD2*c* of a second composite sheet 120*c* on one side and a second longitudinal direction LD2*d* of a second composite sheet 120*d* on the other side, which is adjacent to the second composite sheet 120*c* on the one side. Since the laminate 100 of the present embodiment is a laminate finally laminated in six layers, the laminate 100 shown in FIGS. 6 and 7 is at a stage before the lamination is completed.

As shown in FIG. 6, in the laminate 100 of the present embodiment, an end portion in the longitudinal direction (the second longitudinal direction) of the second composite sheet 120 on one side and an end portion in the longitudinal direction (the second longitudinal direction) of the second composite sheet 120 on the other side, which is adjacent to the second composite sheet 120 on the one side, are disposed in contiguity with each other in a state where the end portions do not overlap each other in the thickness direction (the thickness direction TD shown in FIG. 12). The second composite sheet 120 is a sheet-like material that includes s fiber base material (a second fiber base material) and a resin material (a second resin material).

In the example shown in FIG. 6, the plurality of second composite sheets 120 are disposed in the order of a second composite sheet 120*a*, a second composite sheet 120*b*, the second composite sheet 120*c*, the second composite sheet 120*d*, a second composite sheet 120*e*, and a second composite sheet 120*f* clockwise along the arrangement direction AD passing on the arc having the radius R1 centered on the point O.

As shown in FIG. 6, the plurality of second composite sheets 120 are disposed such that positions P21 to P27 are end portion positions (second end portion positions). The end portions in the longitudinal direction of the second composite sheet 120*a* are disposed at the positions P21 and P22, the end portions in the longitudinal direction of the second composite sheet 120*b* are disposed at the positions P22 and P23, and the end portions in the longitudinal direction of the second composite sheet 120*c* are disposed at the positions P23 and P24. The end portions in the longitudinal direction of the second composite sheet 120*d* are disposed at the positions P24 and P25, the end portions in the longitudinal direction of the second composite sheet 120*e* are disposed at the positions P25 and P26, and the end portions in the longitudinal direction of the second composite sheet 120*f* are disposed at the positions P26 and P27.

As shown in FIG. 6, the plurality of positions P11 to P17 in the arrangement direction AD where the end portions of the plurality of first composite sheets 110 are disposed are positions different from the plurality of positions P21 to P27 in the arrangement direction AD where the end portions of the plurality of second composite sheets 120 are disposed. By making the positions P11 to P17 different from the positions P21 to P27, a position which becomes a cut line of the first composite sheet 110 in the first layer composed of the plurality of first composite sheets 110 and a position which becomes a cut line of the second composite sheet 120 in the second layer composed of the plurality of second composite sheets 120 become different from each other. Therefore, the strength of the structure that is manufactured from the laminate 100 can be increased as compared with a case where these positions coincide with each other.

As shown in FIG. 7, the second composite sheet 120*c* has a second longitudinal direction LD2*c* along the arrangement direction AD and a second lateral direction SD2*c*, and the second composite sheet 120*d* has a second longitudinal direction LD2*d* along the arrangement direction AD and a second lateral direction SD2*d*, and the second composite sheet 120*e* has a second longitudinal direction LD2*e* along the arrangement direction AD and a second lateral direction SD2*e*. Each of the second composite sheet 120*a*, the second composite sheet 120*b*, the second composite sheet 120*e*, and the second composite sheet 120*f* also has a second longitudinal direction LD2 and a second lateral direction SD2.

As shown in FIG. 8, the second composite sheet 120*d* has an isosceles trapezoidal shape in which the length of the second longitudinal direction LD2*d* on the other side (the outer periphery side with respect to the point O) in the second lateral direction SD2*d* is longer than the length of the second longitudinal direction LD2*d* on one side (the inner periphery side with respect to the point O) in the second lateral direction SD2*d*. The other second composite sheets 120 (120*a*, 120*b*, 120*c*, 120*e*, 120*f*) also has the same shape.

In the laminate 100 of the present embodiment, the side of the end portion in the second longitudinal direction LD2 of the second composite sheet 120 having an isosceles trapezoidal shape and the side of the end portion in the second longitudinal direction LD2 of the other second composite sheet 120 adjacent to the second composite sheet

120 are disposed without a gap along the arrangement direction AD such that the positions of the sides coincide with each other.

The line on the surface of the second composite sheet 120*d* shown in FIG. 8 indicates the fiber direction (the second fiber direction FD2) in which the fiber base material that is included in the second composite sheet 120*d* is oriented. As shown in FIG. 8, a second fiber direction FD2*d* of the second composite sheet 120*d* is the same direction as the second longitudinal direction LD2*d*. That is, the angle (a second predetermined angle) formed by the second fiber direction FD2*d* and the second longitudinal direction LD2*d* is 0 degrees.

In the present embodiment, the second fiber direction FD2 of the second composite sheet 120 that is laminated in the second layer has an angle of 0 degrees with respect to the second longitudinal direction LD2. However, other aspects may be acceptable. For example, the angle (the second predetermined angle) formed by the second fiber direction FD2*d* and the second longitudinal direction LD2*d* of the second composite sheet 120 that is laminated in the second layer may be set to be any angle such as 90 degrees, 45 degrees, or −45 degrees.

As shown in FIG. 6, each of the second composite sheets 120*a*, 120*b*, 120*c*, 120*d*, 120*e*, and 120*f* is disposed along the curved arrangement direction AD such that the second longitudinal direction LD2 of the second composite sheet 120 on one side and the second longitudinal direction LD2 of the second composite sheet 120 on the other side, which is adjacent to the second composite sheet 120 on the one side, intersect with each other. As shown in FIGS. 7 and 9, for example, the second longitudinal direction LD2*d* of the second composite sheet 120*d* on one side and the second longitudinal direction LD2*c* of the second composite sheet 120*c* on the other side, which is adjacent to the second composite sheet 120*d* on the one side, are disposed so as to intersect with each other at the intersection angle α. The intersection angle α is the same as the intersection angle at which the first longitudinal direction LD1 of the first composite sheet 110 on one side and the first longitudinal direction LD1 of the first composite sheet 110 on the other side, which is adjacent to the first composite sheet 110 on the one side, intersect with each other in the first layer.

Figure 10:
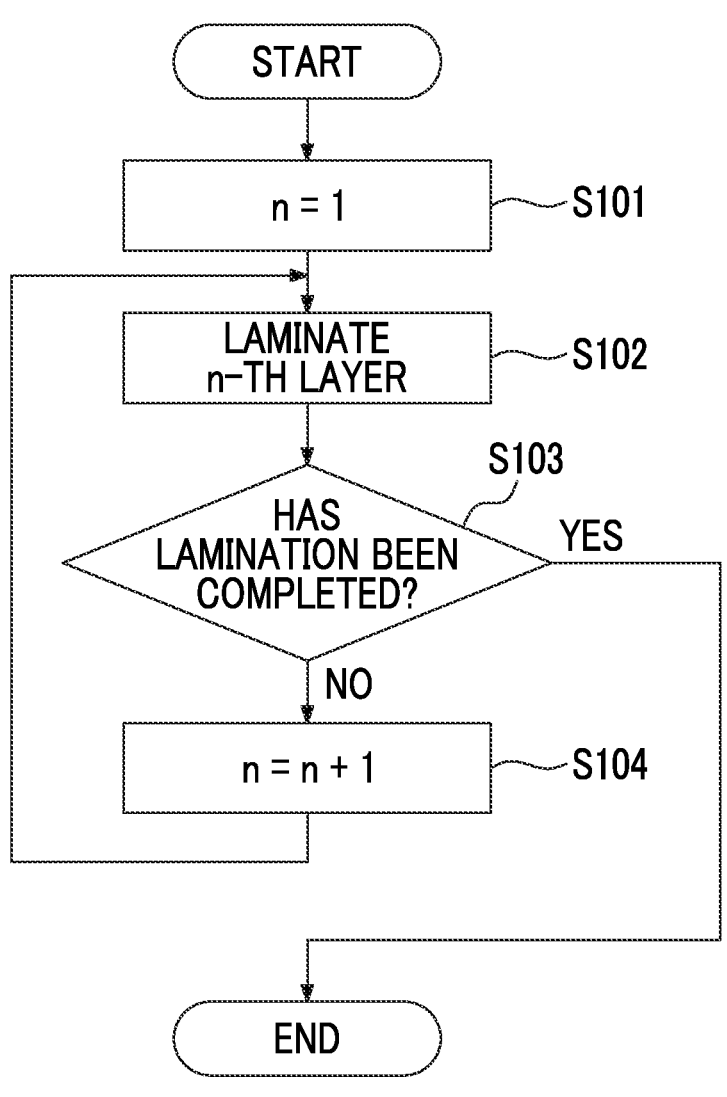
FIG. 10 is a flowchart showing a lamination method of the present embodiment.

Here, a lamination method of the present embodiment will be described with reference to FIG. 10. FIG. 10 is a flowchart showing the lamination method of the present embodiment.

In step S101, n=1 is set, and in step S102, a plurality of composite sheets of an n-th layer are laminated.

After the plurality of composite sheets of the n-th layer are laminated, in step S103, it is determined whether or not the lamination has been completed, and if the determination is NO, the processing proceeds to step S104, and if the determination is YES, the processing of this flowchart is ended. In step S104, n=n+1 is set and the lamination of the next layer is performed in step S102.

In this way, the second layer (LY2 in FIG. 12) that includes the plurality of second composite sheets 120 is laminated in a state of being in contact with the first layer (LY1 in FIG. 12) that includes the plurality of first composite sheets 110. A third layer (LY3 in FIG. 12) that includes a plurality of third composite sheets is laminated on the second layer, and a fourth layer (LY4 in FIG. 12) that includes a plurality of fourth composite sheets is laminated on the third layer, a fifth layer (LY5 in FIG. 12) that includes a plurality of fifth composite sheets is laminated on the fourth layer, and a sixth layer (LY6 in FIG. 12) that includes a plurality of sixth composite sheets is laminated on the fifth layer.

Figure 11:
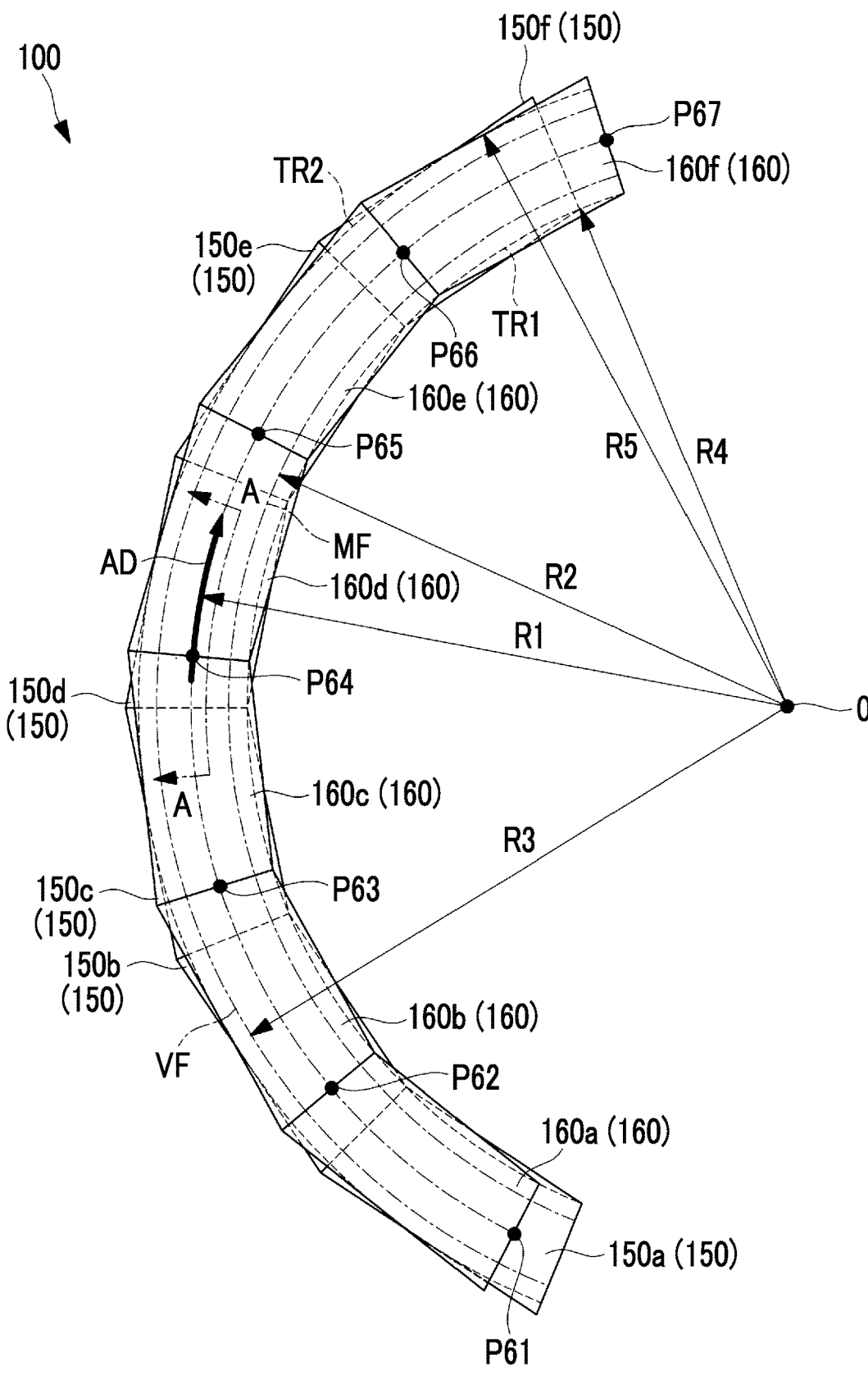
FIG. 11 is a plan view showing a laminate in which a plurality of sixth composite sheets of a sixth layer are laminated.

FIG. 11 is a plan view showing the laminate 100 in which the plurality of sixth composite sheets 160 of the sixth layer are laminated. FIG. 12 is a sectional view taken along line A-A and viewed in the direction of an arrow in the laminate shown in FIG. 11. In FIG. 11, the illustration of the fiber directions of the plurality of sixth composite sheets 160 is omitted.

In the example shown in FIG. 6, the plurality of second composite sheets 120 are disposed in the order of a second composite sheet 120*a*, a second composite sheet 120*b*, the second composite sheet 120*c*, the second composite sheet 120*d*, a second composite sheet 120*e*, and a second composite sheet 120*f* clockwise along the arrangement direction AD passing on the arc having the radius R1 centered on the point O.

In the example shown in FIG. 11, each of a plurality of fifth composite sheets 150 and a plurality of sixth composite sheets 160 is disposed clockwise along the arrangement direction AD passing on the arc having the radius R1 centered on the point O. In FIG. 11, the illustration of the first composite sheet 110, the second composite sheet 120, the third composite sheet 130, and the fourth composite sheet 140 are omitted.

As shown in FIG. 11, the plurality of sixth composite sheets 160 are disposed such that positions P61 to P67 are end portion positions. The end portions in the longitudinal direction of the sixth composite sheet 160*a* are disposed at the positions P61 and P62, the end portions in the longitudinal direction of the sixth composite sheet 160*b* are disposed at the positions P62 and P63, and the end portions in the longitudinal direction of the sixth composite sheet 160*c* are disposed at the positions P63 and P64. The end portions in the longitudinal direction of the sixth composite sheet 160*d* are disposed at the positions P64 and P65, the end portions in the longitudinal direction of the sixth composite sheet 160*e* are disposed at the positions P65 and P66, and the end portions in the longitudinal direction of the sixth composite sheet 160*f* are disposed at the positions P66 and P67.

As shown in FIG. 12, in the laminate 100, the plurality of first end portion positions (for example, the position P14) in the arrangement direction AD in which the end portions of the plurality of first composite sheets 110 are disposed are positions different from the plurality of second end positions (for example, the position P24) in the arrangement direction AD in which the end portions of the plurality of second composite sheets 120 are disposed. Similarly, the end portion positions of the layers adjacent to each other in the thickness direction TD are positions different from each other.

In the example shown in FIG. 12, the end portion position P24 of the second composite sheet 120 of the second layer LY2 is a position different from the end portion position P14 of the first composite sheet 110 of the first layer LY1 and an end portion position P34 of the third composite sheet 130 of the third layer LY3 in the arrangement direction AD. Similarly, an end portion position P44 of the fourth composite sheet 140 of the fourth layer LY4 is a position different from the end portion position P34 of the third composite sheet 130 of the third layer LY3 and an end portion position P54 of the fifth composite sheet 150 of the fifth layer LY5 in the arrangement direction AD. Further, an end portion position P64 of the sixth composite sheet 160 of the sixth layer LY6 is a position different from the end portion position P54 of the fifth composite sheet 150 of the fifth layer LY5 in the arrangement direction AD.

In this manner, by making the positions in the arrangement direction of the position P14, the position P24, the position P34, the position P44, the position P54, and the position P64 different between the composite sheet layers adjacent to each other, the strength of the structure that is manufactured from the laminate 100 can be increased as compared with a case where these positions coincide with each other.

Figure 13:
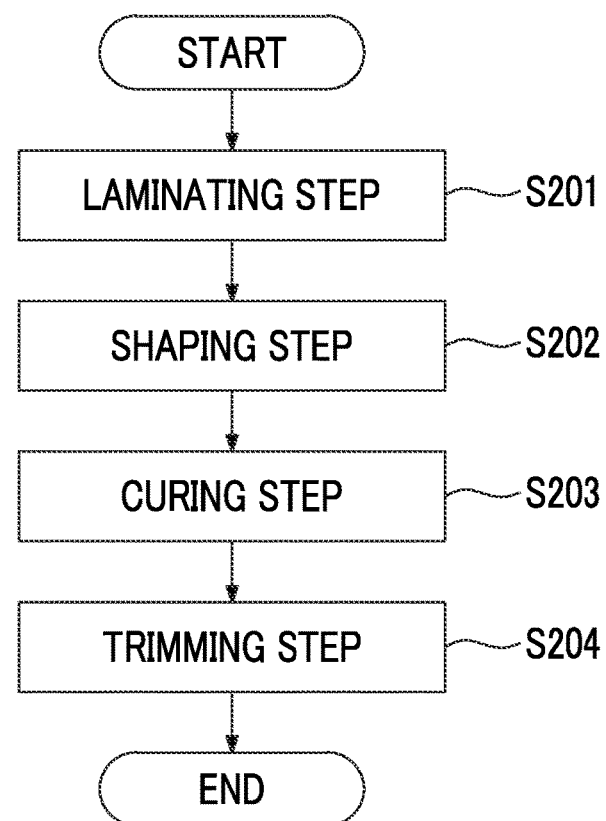
FIG. 13 is a flowchart showing a method for manufacturing a composite material of the present embodiment.

Next, a method for manufacturing a composite material of the present embodiment will be described. FIG. 13 is a flowchart showing the method for manufacturing the composite material of the present embodiment.

In step S201, the laminating step described in steps S101 to S104 of FIG. 10 is executed.

In step S202, the laminate 100 laminated in the laminating step is shaped by using a shaping device (not shown) such that the surface orthogonal to the arrangement direction AD has a Z shape in the cross-sectional view. Specifically, the laminate 100 is shaped into an upward fold along an upward fold line MF shown in FIG. 11 by the shaping device such that a bending angle is 90 degrees, and is shaped into a downward fold along a downward fold line VF shown in FIG. 11 such that a bending angle is 90 degrees. The upward fold line MF is a line passing on an arc having a radius R2 centered on the point O, and the radius R2 is smaller than the radius R1. The downward fold line VF is a line passing on an arc having a radius R3 centered on the point O, and the radius R3 is larger than the radius R1.

In step S203, a curing step of curing the composite sheet configuring the laminate 100 is executed. In a case where the resin material that is included in the composite sheet is thermosetting resin, the thermosetting resin is cured by heating the laminate 100 shaped in step S202 in an autoclave. In a case where the resin material that is included in the composite sheet is thermoplastic resin, the thermoplastic resin is cured by cooling the laminate 100 shaped in a state of being heated in step S202.

In step S204, end portions in a width direction of the laminate 100 are trimmed (cut off) to adjust the shape of the laminate 100. Specifically, the laminate 100 inside an inner trimming line TR1 shown in FIG. 11 is cut off by a trimming device (not shown) such as a water jet cutter, and the laminate 100 outside an outer trimming line TR2 shown in FIG. 11 is cut off. The inner trimming line TR1 is a line passing on an arc having a radius R4 centered on the point O, and the radius R4 is smaller than the radius R2. The outer trimming line TR2 is a line passing on an arc having a radius R5 centered on the point O, and the radius R5 is larger than the radius R3.

The operation and effects of the laminate 100 according to the present embodiment described above will be described.

According to the laminate 100 according to the present disclosure, each of the plurality of first composite sheets 110 configuring the first layer LY1 has the first longitudinal direction LD1 and the first lateral direction SD1. Further, the first fiber direction FD1 of each of the plurality of first composite sheets 110 configuring the first layer LY1 has a first predetermined angle θ1 with respect to the first longitudinal direction LD1. Similarly, each of the plurality of second composite sheets 120 configuring the second layer LY2 has the second longitudinal direction LD2 and the second lateral direction SD2. Further, the second fiber direction FD2 of each of the plurality of second composite sheets 120 configuring the second layer LY2 has a second predetermined angle θ2 with respect to the second longitudinal direction LD2. Each of the first predetermined angle θ1 and the second predetermined angle θ2 is, for example, any angle of 0 degrees, 90 degrees, 45 degrees, −45 degrees, and the like.

According to the laminate 100 according to the present disclosure, in the plurality of first composite sheets 110, the end portion in the first longitudinal direction LD1c of the first composite sheets 110c on one side and the end portion in the first longitudinal direction LD1d of the first composite sheet 110d on the other side, which is adjacent to the first composite sheet 110c on the one side, are disposed in contiguity with each other in a state where the end portions do not overlap each other in the thickness direction TD. Further, in the plurality of second composite sheets 120, the end portion in the second longitudinal direction LD2c of the second composite sheets 120c on one side and the end portion in the second longitudinal direction LD2d of the second composite sheet 120d on the other side, which is adjacent to the second composite sheet 120c on the one side, are disposed in contiguity with each other in a state where the end portions do not overlap each other in the thickness direction TD. In the laminate 100, the plurality of first composite sheets 110 and the plurality of second composite sheets 120 are disposed in contiguity with each other, and therefore, unnecessary portions are not generated during manufacturing, and the manufacturing cost can be reduced.

According to the laminate 100 according to the present disclosure, the first longitudinal direction LD1c of the first composite sheet 110c on one side and the first longitudinal direction LD1d of the first composite sheet 110d on the other side are disposed along the curved arrangement direction AD so as to intersect with each other. Further, the second longitudinal direction LD2c of the second composite sheet 120c on one side and the second longitudinal direction LD2d of the second composite sheet 120d on the other side are disposed along the curved arrangement direction AD so as to intersect with each other.

Therefore, in each of the first composite sheets 110, the first composite sheet 110 is disposed along the curved arrangement direction as a whole while orienting the first fiber base material in the first fiber direction FD1 without causing in-plane deformation. Similarly, in each of the second composite sheets 120, the second composite sheet 120 is disposed along the curved arrangement direction AD as a whole while orienting the second fiber base material in the second fiber direction FD2 without causing in-plane deformation. Since neither the first composite sheet 110 nor the second composite sheet 120 undergoes the in-plane deformation, the manufacturing quality of the laminate 100 can be improved.

In the laminate 100 of the present embodiment, the intersection angle α at which the first longitudinal direction LD1c of the first composite sheet 110c on one side and the first longitudinal direction LD1d of the first composite sheet 110d on the other side intersect with each other is 30 degrees or smaller.

By setting the intersection angle α to 30 degrees or smaller, it is possible to enhance the approximation of the first longitudinal direction LD1 to the curved arrangement direction AD and the manufacturing quality of the laminate 100 associated with the approximation.

In the laminate 100 according to the present embodiment, the plurality of first end portion positions P11 to P17 in the arrangement direction AD in which the end portions of the plurality of first composite sheets 110 are disposed are positions different from the second end portion positions P21 to P27 in the arrangement direction AD in which the end portions of the plurality of second composite sheets 120 are disposed.

According to the laminate 100 according to the present disclosure, by making the first end portion position different from the second end portion position, it is possible to increase the strength of the structure obtained by curing the laminate 100, as compared with a case where the first end portion position and the second end portion position coincide with each other. That is, it is possible to suppress cracks or breaks that may occur in a case where the first end portion position and the second end portion position coincide with each other.

The laminate described in the embodiment described above is grasped as follows, for example.

The laminate (100) according to the present disclosure includes: the plurality of first composite sheets (110) having the first longitudinal direction (LD1) and the first lateral direction (SD1) and including the first fiber base material oriented in the first fiber direction (FD1) having a first predetermined angle (θ1) with respect to the first longitudinal direction and a first resin material; and the plurality of second composite sheets (120) having the second longitudinal direction (LD2) and the second lateral direction (SD2) and including the second fiber base material oriented in the second fiber direction (FD2) having a second predetermined angle with respect to the second longitudinal direction and a second resin material, in which the second layer (LY2) that includes the plurality of second composite sheets is laminated in a state of being in contact with the first layer (Ly1) that includes the plurality of first composite sheets, the plurality of first composite sheets are disposed along the curved arrangement direction (AD) such that the end portion in the first longitudinal direction of the first composite sheet on one side and the end portion in the first longitudinal direction of the first composite sheet on the other side, which is adjacent to the first composite sheet on the one side, are in contiguity with each other in a state where the end portions do not overlap each other in the thickness direction (TD) and the first longitudinal direction of the first composite sheet on the one side and the first longitudinal direction of the first composite sheet on the other side intersect with each other, and the plurality of second composite sheets are disposed along the arrangement direction such that the end portion in the second longitudinal direction of the second composite sheet on one side and the end portion in the second longitudinal direction of the second composite sheet on the other side, which is adjacent to the first composite sheet on the one side, are in contiguity with each other in a state where the end portions do not overlap each other in the thickness direction and the second longitudinal direction of the second composite sheet on the one side and the second longitudinal direction of the second composite sheet on the other side intersect with each other.

According to the laminate according to the present disclosure, each of the plurality of first composite sheets configuring the first layer has the first longitudinal direction and the first lateral direction. Further, the first fiber direction of each of the plurality of first composite sheets configuring the first layer has the first predetermined angle with respect to the first longitudinal direction. Similarly, each of the plurality of second composite sheets configuring the second layer has the second longitudinal direction and the second lateral direction. Further, the second fiber direction of each of the plurality of second composite sheets configuring the second layer has the second predetermined angle with respect to the second longitudinal direction. Each of the first predetermined angle and the second predetermined angle is, for example, any angle of 0 degrees, 90 degrees, 45 degrees, −45 degrees, and the like.

According to the laminate according to the present disclosure, in the plurality of first composite sheets, the end portion in the first longitudinal direction of the first composite sheet on one side and the end portion in the first longitudinal direction of the first composite sheet on the other side, which is adjacent to the first composite sheet on the one side, are disposed in contiguity with each other in a state where the end portions do not overlap each other in the thickness direction. Further, in the plurality of second composite sheets, the end portion in the second longitudinal direction of the second composite sheet on one side and the end portion in the second longitudinal direction of the second composite sheet on the other side, which is adjacent to the first composite sheet on the one side, are disposed in contiguity with each other in a state where the end portions do not overlap each other in the thickness direction. In the laminate, the plurality of first composite sheets and the plurality of second composite sheets are disposed in contiguity with each other, and therefore, unnecessary portions are not generated during manufacturing, and the manufacturing cost can be reduced.

According to the laminate according to the present disclosure, the first longitudinal direction of the first composite sheet on one side and the first longitudinal direction of the first composite sheet on the other side are disposed along the curved arrangement direction so as to intersect with each other. Further, the second longitudinal direction of the second composite sheet on one side and the second longitudinal direction of the second composite sheet on the other side are disposed along the curved arrangement direction so as to intersect with each other. Therefore, in each of the first composite sheets, the first composite sheet is disposed along the curved arrangement direction as a whole while orienting the first fiber base material in the first fiber direction without causing in-plane deformation. Similarly, in each of the second composite sheets, the second composite sheet is disposed along the curved arrangement direction as a whole while orienting the second fiber base material in the second fiber direction without causing in-plane deformation. Since neither the first composite sheet nor the second composite sheet undergoes the in-plane deformation, the manufacturing quality of the laminate can be improved.

In the laminate according to the present disclosure, the arrangement direction is a direction extending along a curved line that is bent in a certain direction.

According to the laminate according to the present disclosure, even in a case where the first composite sheet and the second composite sheet are disposed along the arrangement direction extending along a curved line that is bent in a certain direction, the first composite sheet and the second composite sheet can be appropriately disposed to improve the manufacturing quality.

In the laminate according to the present disclosure, an intersection angle (a) at which the first longitudinal direction of the first composite sheet on the one side and the first longitudinal direction of the first composite sheet on the other side intersect with each other is 30 degrees or smaller.

By setting the intersection angle to 30 degrees or smaller, it is possible to enhance the approximation of the first longitudinal direction to the curved arrangement direction of the plurality of first composite sheets and the manufacturing quality of the laminate associated with the approximation.

In the laminate according to the present disclosure, an intersection angle (a) at which the second longitudinal direction of the second composite sheet on the one side and the second longitudinal direction of the second composite sheet on the other side intersect with each other is 30 degrees or smaller.

By setting the intersection angle to 30 degrees or smaller, it is possible to enhance the approximation of the second longitudinal direction to the curved arrangement direction of the plurality of second composite sheets and the manufacturing quality of the laminate associated with the approximation.

In the laminate according to the present disclosure, a plurality of first end portion positions (P11 to P17) where end portions of the plurality of first composite sheets are disposed and a plurality of second end portion positions (P21 to P27) where end portions of the plurality of second composite sheets are disposed are different positions in the arrangement direction.

According to the laminate according to the present disclosure, by making the first end portion position and the second end portion position different from each other in the arrangement direction, it is possible to increase the strength of the structure obtained by curing the laminate, as compared with a case where the first end portion position and second end portion position coincide with each other. That is, it is possible to suppress cracks or breaks that may occur in a case where the first end portion position and the second end portion position coincide with each other in the arrangement direction.

The lamination method described in the embodiment described above is grasped as follows, for example.

The lamination method according to the present disclosure is a lamination method of laminating a second layer that includes a plurality of second composite sheets in a state of being in contact with a first layer that includes a plurality of first composite sheets, in which the first composite sheet has a first longitudinal direction and a first lateral direction and is formed in a form of a sheet that includes a first fiber base material oriented in a first fiber direction having a first predetermined angle with respect to the first longitudinal direction and a first resin material, and the second composite sheet has a second longitudinal direction and a second lateral direction and is formed in a form of a sheet that includes a second fiber base material oriented in a second fiber direction having a second predetermined angle with respect to the second longitudinal direction and a second resin material, the method including: a first laminating step of disposing the plurality of first composite sheets along the arrangement direction such that an end portion in the first longitudinal direction of the first composite sheet on one side and an end portion in the first longitudinal direction of the first composite sheet on the other side, which is adjacent to the first composite sheet on the one side, are in contiguity with each other in a state where the end portions do not overlap each other in a thickness direction and the first longitudinal direction of the first composite sheet on the one side and the first longitudinal direction of the first composite sheet on the other side intersect with each other; and a second laminating step of disposing the plurality of second composite sheets along the arrangement direction such that an end portion in the second longitudinal direction of the second composite sheet on one side and an end portion in the second longitudinal direction of the second composite sheet on the other side, which is adjacent to the second composite sheet on the one side, are in contiguity with each other in a state where the end portions do not overlap each other in the thickness direction and the second longitudinal direction of the second composite sheet on the one side and the second longitudinal direction of the second composite sheet on the other side intersect with each other.

According to the lamination method according to the present disclosure, in the plurality of first composite sheets, by the first laminating step, the end portion in the first longitudinal direction of the first composite sheet on one side and the end portion in the first longitudinal direction of the first composite sheet on the other side, which is adjacent to the first composite sheet on the one side, are disposed in contiguity with each other in a state where the end portions do not overlap each other in the thickness direction. Further, in the plurality of second composite sheets, by the second laminating step, the end portion in the second longitudinal direction of the second composite sheet on one side and the end portion in the second longitudinal direction of the second composite sheet on the other side, which is adjacent to the first composite sheet on the one side, are disposed in contiguity with each other in a state where the end portions do not overlap each other in the thickness direction. In the first laminating step and the second laminating step, the plurality of first composite sheets and the plurality of second composite sheets are disposed in contiguity with each other, and therefore, unnecessary portions are not generated during manufacturing, and the manufacturing cost can be reduced.

According to the lamination method according to the present disclosure, by the first laminating step, the first longitudinal direction of the first composite sheet on one side and the first longitudinal direction of the first composite sheet on the other side are disposed along the curved arrangement direction so as to intersect with each other. Further, by the second laminating step, the second longitudinal direction of the second composite sheet on one side and the second longitudinal direction of the second composite sheet on the other side are disposed along the curved arrangement direction so as to intersect with each other. Therefore, in each of the first composite sheets, the first composite sheet is disposed along the curved arrangement direction as a whole while orienting the first fiber base material in the first fiber direction without causing in-plane deformation. Similarly, in each of the second composite sheets, the second composite sheet is disposed along the curved arrangement direction as a whole while orienting the second fiber base material in the second fiber direction without causing in-plane deformation. Since neither the first composite sheet nor the second composite sheet undergoes the in-plane deformation, the manufacturing quality of the laminate can be improved.

In the lamination method according to the present disclosure, the arrangement direction is a direction extending along a curved line that is bent in a certain direction.

According to the lamination method according to the present disclosure, even in a case where the first composite sheet and the second composite sheet are disposed along the arrangement direction extending along a curved line that is bent in a certain direction, the first composite sheet and the second composite sheet can be appropriately disposed to improve the manufacturing quality.

In the lamination method according to the present disclosure, an intersection angle (a) at which the first longitudinal direction of the first composite sheet on the one side and the first longitudinal direction of the first composite sheet on the other side intersect with each other is 30 degrees or smaller.

By setting the intersection angle to 30 degrees or smaller, it is possible to enhance the approximation of the first longitudinal direction to the curved arrangement direction of the plurality of first composite sheets and the manufacturing quality of the laminate associated with the approximation.

In the lamination method according to the present disclosure, an intersection angle (a) at which the second longitudinal direction of the second composite sheet on the one side and the second longitudinal direction of the second composite sheet on the other side intersect with each other is 30 degrees or smaller.

By setting the intersection angle to 30 degrees or smaller, it is possible to enhance the approximation of the second longitudinal direction to the curved arrangement direction of the plurality of second composite sheets and the manufacturing quality of the laminate associated with the approximation.

In the lamination method according to the present disclosure, a plurality of first end portion positions (P11 to P17) where end portions of the plurality of first composite sheets are disposed and a plurality of second end portion positions (P21 to P27) where end portions of the plurality of second composite sheets are disposed are different positions in the arrangement direction.

According to the lamination method according to the present disclosure, by making the first end portion position and the second end portion position different from each other in the arrangement direction, it is possible to increase the strength of the structure obtained by curing the laminate, as compared with a case where the first end portion position and the second end portion position coincide with each other. That is, it is possible to suppress cracks or breaks that may occur in a case where the first end portion position and the second end portion position coincide with each other in the arrangement direction.

REFERENCE SIGNS LIST

20: frame
100: laminate
110: first composite sheet
120: second composite sheet
AD: arrangement direction
FD1: first fiber direction
FD2: second fiber direction
LD1: first longitudinal direction
LD2: second longitudinal direction
LY1: first layer
LY2: second layer
MF: upward fold line
SD1: first lateral direction
SD2: second lateral direction
Su: lamination surface
TD: thickness direction
TR1: inner trimming line
TR2: outer trimming line
VF: downward fold line
α: intersection angle
The invention claimed is:

1. A laminate comprising:
a plurality of first composite sheets each having a first longitudinal direction and a first lateral direction and including a first fiber base material oriented in a first fiber direction having a first predetermined angle with respect to the first longitudinal direction and a first resin material; and
a plurality of second composite sheets each having a second longitudinal direction and a second lateral direction and including a second fiber base material oriented in a second fiber direction having a second predetermined angle with respect to the second longitudinal direction and a second resin material,
wherein
a second layer that includes the plurality of second composite sheets is laminated in a state of being in contact with a first layer that includes the plurality of first composite sheets,
the plurality of first composite sheets are disposed along a curved arrangement direction such that an end portion in the first longitudinal direction of each first composite sheet on one side and an end portion in the first longitudinal direction of an adjacent first composite sheet on the other side, which is adjacent to the first composite sheet on the one side, are in contiguity with each other in a state where the end portions do not overlap each other in a thickness direction and the first longitudinal direction of each first composite sheet on the one side and the first longitudinal direction of an adjacent first composite sheet on the other side intersect with each other,
the plurality of second composite sheets are disposed along the arrangement direction such that an end portion in the second longitudinal direction of each second composite sheet on one side and an end portion in the second longitudinal direction of an adjacent second composite sheet on the other side, which is adjacent to the second composite sheet on the one side, are in contiguity with each other in a state where the end portions do not overlap each other in the thickness direction and the second longitudinal direction of each second composite sheet on the one side and the second longitudinal direction of an adjacent second composite sheet on the other side intersect with each other,
each of the plurality of first composite sheets is formed linearly in the first longitudinal direction,
each of the plurality of second composite sheets is formed linearly in the second longitudinal direction, and
at least one of the first predetermined angle and the second predetermined angle is 0 degrees, the first longitudinal direction is coincident with the first fiber direction when the first predetermined angle is 0 degrees, and the second longitudinal direction is coincident with the second fiber direction when the second predetermined angle is 0 degrees.

2. The laminate according to claim 1, wherein the arrangement direction is a direction extending along a curved line that is bent in a certain direction.

3. The laminate according to claim 1, wherein an intersection angle at which the first longitudinal direction of each first composite sheet on the one side and the first longitudinal direction of an adjacent first composite sheet on the other side intersect with each other is 30 degrees or smaller.

4. The laminate according to claim 3, wherein an intersection angle at which the second longitudinal direction of each second composite sheet on the one side and the second longitudinal direction of an adjacent second composite sheet on the other side intersect with each other is 30 degrees or smaller.

5. The laminate according to claim 1, wherein a plurality of first end portion positions where end portions of the plurality of first composite sheets are disposed and a plurality of second end portion positions where end portions of the plurality of second composite sheets are disposed are different positions in the arrangement direction.

6. A lamination method of laminating a second layer that includes a plurality of second composite sheets in a state of being in contact with a first layer that includes a plurality of first composite sheets, in which each first composite sheet of the plurality of first composite sheets has a first longitudinal direction and a first lateral direction and is formed in a form of a sheet that includes a first fiber base material oriented in a first fiber direction having a first predetermined angle with respect to the first longitudinal direction and a first resin material, and each second composite sheet of the plurality of second composite sheets has a second longitudinal direction and a second lateral direction and is formed in a form of a sheet that includes a second fiber base material oriented in a second fiber direction having a second predetermined angle with respect to the second longitudinal direction and a second resin material, the method comprising:

a first laminating step of disposing the plurality of first composite sheets along an arrangement direction such that an end portion in the first longitudinal direction of each first composite sheet on one side and an end portion in the first longitudinal direction of an adjacent first composite sheet on the other side, which is adjacent to the first composite sheet on the one side, are in contiguity with each other in a state where the end portions do not overlap each other in a thickness direction and the first longitudinal direction of each first composite sheet on the one side and an adjacent first longitudinal direction of the first composite sheet on the other side intersect with each other; and a second laminating step of disposing the plurality of second composite sheets along the arrangement direction such that an end portion in the second longitudinal direction of each second composite sheet on one side and an end portion in the second longitudinal direction of an adjacent second composite sheet on the other side, which is adjacent to the second composite sheet on the one side, are in contiguity with each other in a state where the end portions do not overlap each other in the thickness direction and the second longitudinal direction of each second composite sheet on the one side and the second longitudinal direction of an adjacent second composite sheet on the other side intersect with each other, wherein each of the plurality of first composite sheets is formed linearly in the first longitudinal direction, each of the plurality of second composite sheets is formed linearly in the second longitudinal direction, and at least one of the first predetermined angle and the second predetermined angle is 0 degrees, the first longitudinal direction is coincident with the first fiber direction when the first predetermined angle is 0 degrees, and the second longitudinal direction is coincident with the second fiber direction when the second predetermined angle is 0 degrees.

7. The lamination method according to claim 6, wherein the arrangement direction is a direction extending along a curved line that is bent in a certain direction.

8. The lamination method according to claim 6, wherein an intersection angle at which the first longitudinal direction of each first composite sheet on the one side and the first longitudinal direction of an adjacent first composite sheet on the other side intersect with each other is 30 degrees or smaller.

9. The lamination method according to claim 8, wherein an intersection angle at which the second longitudinal direction of each second composite sheet on the one side and the second longitudinal direction of an adjacent second composite sheet on the other side intersect with each other is 30 degrees or smaller.

10. The lamination method according to claim 6, wherein a plurality of first end portion positions where end portions of the plurality of first composite sheets are disposed and a plurality of second end portion positions where end portions of the plurality of second composite sheets are disposed are different positions in the arrangement direction.

* * * * *